(12) United States Patent
Coffey et al.

(10) Patent No.: US 10,566,032 B2
(45) Date of Patent: Feb. 18, 2020

(54) ASSEMBLIES AND DEVICES WITH A METAL BASE, A METAL COVER, AND A FRICTION STIR WELD, PRECURSORS THEREOF, AND RELATED FRICTION STIR WELDING METHODS

(71) Applicant: Seagate Technology LLC, Cupertino, CA (US)

(72) Inventors: Jerome Thomas Coffey, Boulder, CO (US); Samuel Edward Severson, Longmont, CO (US); Jeffrey L. Bruce, Longmont, CO (US); Emily Ann Chesnut, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 12 days.

(21) Appl. No.: 15/698,990

(22) Filed: Sep. 8, 2017

(65) Prior Publication Data

US 2019/0076956 A1    Mar. 14, 2019

(51) Int. Cl.
| | | |
|---|---|---|
| *B23K 20/24* | (2006.01) | |
| *G11B 33/14* | (2006.01) | |
| *B23K 20/12* | (2006.01) | |
| *G06F 1/16* | (2006.01) | |
| *B23K 101/36* | (2006.01) | |

(52) U.S. Cl.
CPC ........ *G11B 33/1466* (2013.01); *B23K 20/122* (2013.01); *B23K 20/129* (2013.01); *B23K 20/24* (2013.01); *G06F 1/1613* (2013.01); *G11B 33/1446* (2013.01); *B23K 2101/36* (2018.08)

(58) Field of Classification Search
CPC .............. G11B 25/043; G11B 33/1466; G11B 33/1446
See application file for complete search history.

(56) References Cited

U.S. PATENT DOCUMENTS

| | | | | |
|---|---|---|---|---|
| 4,686,592 A * | 8/1987 | Carroll | ..................... | G11B 5/54 360/135 |
| 5,097,978 A * | 3/1992 | Eckerd | ............... | G11B 33/1466 220/315 |
| 5,223,996 A * | 6/1993 | Read | ....................... | G11B 33/08 360/99.18 |
| 5,454,157 A * | 10/1995 | Ananth | ................. | G11B 33/121 29/467 |
| 5,696,648 A * | 12/1997 | Jeong | .................. | G11B 33/1466 360/99.22 |
| 6,693,767 B1 * | 2/2004 | Butler | .................. | G11B 25/043 360/97.13 |
| 7,218,473 B2 * | 5/2007 | Bernett | .............. | G11B 33/1466 29/603.03 |
| 8,014,167 B2 * | 9/2011 | Gunderson | ............ | F16J 15/102 174/250 |
| 8,016,179 B2 | 9/2011 | Burford | | |
| 8,279,552 B2 | 10/2012 | Stipe | | |
| 8,593,760 B2 * | 11/2013 | McGuire, Jr. | ........ | G11B 25/043 360/99.16 |

(Continued)

*Primary Examiner* — Brian E Miller
(74) *Attorney, Agent, or Firm* — Kagan Binder, PLLC (57) ABSTRACT

Described are devices and assemblies (e.g., precursors to a devices) that include a friction stir weld or a joint useful for forming a friction stir weld, the devices containing two metal components that form the joint at which the friction stir weld can be produced, as well as methods for producing a devices, assembly, joints, or friction stir weld as described.

17 Claims, 4 Drawing Sheets

(56) References Cited

U.S. PATENT DOCUMENTS

| | | | | |
|---|---|---|---|---|
| 9,190,115 B2* | 11/2015 | McGuire, Jr. | ........ | G11B 33/022 |
| 9,536,572 B2 | 1/2017 | Lapp et al. | | |
| 9,721,620 B2* | 8/2017 | Sudo | .................... | G11B 25/043 |
| 9,786,330 B1* | 10/2017 | Usami | .................. | G11B 33/027 |
| 10,399,177 B1* | 9/2019 | Coffey | .................... | H05K 5/04 |
| 2003/0179489 A1* | 9/2003 | Bernett | ............. | G11B 33/1466 |
| | | | | 360/97.22 |
| 2007/0064403 A1 | 3/2007 | Badarinarayan et al. | | |
| 2012/0275052 A1* | 11/2012 | McGuire, Jr. | ........ | G11B 33/022 |
| | | | | 360/97.12 |
| 2012/0275287 A1* | 11/2012 | McGuire, Jr. | ........ | G11B 25/043 |
| | | | | 369/75.11 |
| 2014/0368948 A1* | 12/2014 | Okutani | ............... | G11B 25/043 |
| | | | | 360/97.12 |
| 2017/0062019 A1 | 3/2017 | Severson et al. | | |

* cited by examiner

FIG. 3

ASSEMBLIES AND DEVICES WITH A METAL BASE, A METAL COVER, AND A FRICTION STIR WELD, PRECURSORS THEREOF, AND RELATED FRICTION STIR WELDING METHODS

FIELD

The invention relates to electronic devices that include a friction stir weld, and precursors of these devices such as assemblies that contain two metal components that form a joint at which a friction stir weld can be produced, as well as methods for producing a friction stir weld at a joint.

BACKGROUND

Electronic devices such as data storage devices (e.g., hard disk drives or HDDs), solid state memories, microelectronic devices, and computers (e.g., personal computers, cell phones, tablets, laptops, etc.) are involved in countless modern activities. Our reliance on these devices continues to increase, as do the performance requirements of these devices such as their speed and reliability.

To increase reliability of many types of advanced electronic devices, many electronically-functional components of these devices are placed within an enclosure that can be closed or sealed to prevent moisture, gases, and particulates from contacting these components. Moisture coming into contact with functional features of an electronic device, for example, can cause performance problems by the moisture becoming deposited onto electronically functioning surfaces of the device or by causing corrosion. Some device enclosures include a filter or desiccant to capture particles and moisture at the interior of the enclosure, or to prevent moisture or particles from passing into the enclosure.

Other device enclosures can be more tightly sealed, e.g., hermetically sealed, to prevent essentially any amount of gas from entering or exiting the interior of the enclosure. Optionally, enclosures of some advanced electronic devices (e.g., hard disk drives) may be hermetically sealed and filled with a non-air atmosphere, for example a low density atmosphere, as a way to improve device performance. There are various benefits to operating a hard disk drive, for example, in a low density atmosphere, with helium being one specific example of a low density atmosphere useful as a replacement for air. A low density atmosphere (relative to air, e.g., a helium atmosphere) in a hard disk drive (HDD) can reduce the amount of drag force that affects a spinning disk or a stack of closely-spaced spinning disks. The reduced amount of drag can significantly reduce the amount of power required to cause the disk or disk stack to spin. Also, a low density (e.g., helium) atmosphere can reduce the amount of un-wanted, non-rotational movement or "flutter" that occurs in a spinning disk and a disk suspension during use. Reducing un-wanted motion of a disk or disk suspension can allow adjacent disks of a disk stack to be placed more closely together, which increases areal density (a measure of the quantity of information bits that can be stored on a given area of disk surface) by enabling a narrower data track pitch. Efficient thermal conduction of helium can also allow for a reduced operating temperature of a device, and lower density gases (relative to air) can produce less acoustic noise. The reliability of a hard disk drive that contains helium in a hermetically sealed enclosure can also be increased due to reduced levels of humidity, other corrosive gases, and contaminants, and due to a reduced sensitivity of the atmosphere to altitude and external pressure variations.

An electronic device that is designed to be hermetically sealed must include an enclosure that can be assembled and hermetically sealed in a manner that effectively, efficiently, and reliably produces a long-lasting hermetic seal.

SUMMARY

Friction stir welding is a technique that is known to be useful in various applications for welding metals. See for example U.S. Pat. Nos. 8,016,179 and 9,536,572, the entireties of these documents being incorporated herein by reference. Friction stir welding techniques, however, are known to have limits, and are understood to be not necessarily effective or efficient for all situations where a weld between to separate metal components is required. Friction stir welding techniques can be most effectively and reliably used for welding together two metal components that each have a certain minimum thickness, for example two metal components that each have a minimum thickness and with both metal components having thicknesses that are somewhat similar. Friction stir welding may not necessarily be reliably or successfully used to weld together two metal components that each have a thickness that is too thin, or to weld together a first metal component having a relatively thin dimension with a second metal component having a relatively larger thickness.

Moreover, even where the use of a friction stir weld is generally suitable, a friction stir welding step can produce a weld that may contain defects. One common defect of a friction stir weld is a "wormhole" defect, which is an elongate space or tunnel-like opening or channel that extends along a length of a friction stir weld near the root of the weld, and that can be caused by inadequate mixing of materials at that location as the materials are being welded. Wormhole defects can be detrimental to achieving a hermetic seal. Process controls for producing a friction stir weld such as a rotational speed of a friction stir tool, translational speed of the tool along a length of a weld, and downward pressure of the tool exerted in a workpiece, can be adjusted to try to prevent the formation of wormhole defects. Still, the feature of "stirring" the materials of the friction stir weld during weld formation, which is an implicit feature of a friction stir welding process, makes this form of welding susceptible to the formation of wormhole defects.

According to the following description, Applicant has identified new assemblies of two metal components, e.g., opposing or adjacent metal components that form an enclosure, such as a cover and a base. These new assemblies include a joint that can be processed by friction stir welding. Likewise, Applicant has identified new methods for forming and assembling the components, including methods of friction stir welding the components together at the joints. The new components, joints, and related methods are useful for producing electronic devices that include a friction stir weld, at a joint, to produce a hermetic seal between the two components. An electronic device that includes the friction stir weld can be hermetically sealed entirely, i.e., at the friction stir weld and elsewhere.

According to various more specific features of example friction stir welding methods, the metal components used to form a joint at which a friction stir weld is prepared can be prepared with highly precise surfaces to prevent the formation of a wormhole defect. The components of an improved joint are precisely formed to eliminate or reduce the presence of any spaces that can create an air pocket between opposed joint surfaces. A friction stir joint prepared from the improved joint is less likely to include a wormhole defect, due to the precision fit at the joint.

In one aspect, the invention relates to an electronic apparatus. The apparatus includes a base that has a horizontal bottom and an inner cavity defined by the bottom and vertical base sidewalls at a base periphery. The sidewalls include an outer surface that includes a shoulder with an upper vertical shoulder surface connecting to a horizontal shoulder surface at an interior shoulder corner. The horizontal shoulder surface extends horizontally from the interior shoulder corner to an exterior shoulder corner. The sidewalls also include a lower vertical shoulder surface that extends vertically from the exterior shoulder corner. The apparatus includes a cover located over the base to enclose the cavity. The cover includes a horizontal top portion over the cavity and a lip at a cover perimeter. The lip extends in a vertical direction relative to the horizontal top portion. The lip includes a lower lip end that includes: a vertical interior lip surface, a vertical exterior lip surface, a horizontal lip surface extending between the vertical interior lip surface and the vertical exterior lip surface, an interior lip corner at an intersection of the horizontal lip surface and the vertical interior lip surface, and an exterior lip corner at an intersection of the horizontal lip surface and the vertical exterior lip surface. The lip engages the upper vertical shoulder surface and engages the shoulder with the interior lip corner being located adjacent to the interior shoulder corner. The horizontal shoulder surface has a width from the interior shoulder corner to the exterior shoulder corner. The lower lip end has a thickness between the interior lip corner and the exterior lip corner that is approximately equal to the width of the horizontal shoulder surface.

In another aspect, the invention relates to a method of forming a friction stir weld. The method includes: providing an apparatus of as described herein, and providing a tool for forming a friction stir weld. The tool includes a support body having a longitudinal axis and a distal end, a distal face at the distal end, and a pin extending from the distal face along the axis. The method includes placing the distal face in contact with the apparatus at a joint formed between a lower lip end and a shoulder, and rotating the tool about the axis while the distal face contacts the joint.

All figures are schematic and are not necessarily to scale.

DETAILED DESCRIPTION

The invention relates to assemblies that include two components used to produce an enclosure of an electronic device, to electronic devices prepared to include such an enclosure, and related methods. The assemblies include two metal components that can be placed adjacent to each other and in contact with each other to form an enclosure, with surfaces of the two metal components forming a joint at which a friction stir weld can be produced to bond the two metal components to each other. Various assemblies that are contemplated and described herein, either generally or specifically, include: an assembly of two metal components (for example an enclosure base and an enclosure cover) that form an enclosure that includes a joint, wherein the two metal components are held together (removably) at the joint by contact and friction in the absence of (i.e., prior to forming) a friction stir weld; as well as a welded assembly of the same such two metal components after a friction stir weld is formed at the joint. The invention additionally relates to the components used to form the assembly either individually or in combination; to methods of forming the different components either individually or in combination; to methods of assembling the components to form an assembly in the form of an enclosure with a joint that may be in an un-welded state or in a welded state; and methods of forming a friction stir weld at a joint of an assembly as described.

The electronic device can be a hermetically sealed hard disk drive as primarily described herein, or may be a different type of electronic device such as a solid state memory device, a semiconductor device, or a general computing device such as a personal (desktop) computer, cell phone, tablet, laptop, or the like.

The electronic device can include an assembly of a first metal component such as a base of an enclosure (or simply "base"), and a second metal component such as a cover of the enclosure (or simply "cover"). The base and cover can be assembled to form an enclosure that includes a joint (i.e., an un-welded, pre-welded, joint) at a location where surfaces of the cover meet surfaces of the base. The joint may be processed by friction stir welding to produce a friction stir weld at the joint to connect the first metal component to the second metal component by way of the friction stir weld. The friction stir weld can produce a hermetic seal at the joint between the base and the cover that prevents air or other gas from entering or escaping the sealed interior of the enclosure, for example to maintain a low density atmosphere (a non-air atmosphere, such as helium) within the enclosure.

Desirably as a feature of certain types of enclosures or electronic devices, an interior of an enclosure between a base and a cover can be filled, before being sealed by friction stir welding, with low density gas to provide a low density (relative to air) atmosphere within the enclosure. The joint of the enclosure can then be processed to produce a friction stir weld along the entire length of the joint, typically about an entire perimeter of a device, to hermetically seal the enclosure and contain the low density gas inside of the enclosure while preventing other gases from an exterior of the enclosure from entering the enclosure. Example hermetically sealed enclosures, including the friction stir weld, can allow for not more than a very low rate of leakage from the enclosure, for example a rate of leakage that is less than 1 percent of a volume of atmosphere (gas) present within the enclosure per year. Examples of hard disk drives that include a base and a cover and that can be hermetically sealed to contain a low density atmosphere are described in U.S. Pat. No. 9,536,572, the entirety of which is incorporated herein by reference. See also U.S. Pat. No. 8,279,552, describing a hermetically sealed hard disk.

Certain specific examples of hard disk drives or other electronic devices of the present description can include a first metal component that is a base, and a second metal component that is a cover. A base generally includes a space or cavity defined by a horizontal (flat, planar) bottom that includes a general perimeter, and additionally by sidewalk that extend about the perimeter and in a vertical direction (relative to the horizontal bottom).

A cover can include a horizontal (flat, planar) top portion and a lip at a perimeter of the horizontal portion, with the lip extending from the perimeter in a vertical direction (relative to the horizontal top portion).

The cover can be placed over the base with vertical surfaces of the lip contacting exterior vertical surfaces of the sidewalls to form a joint. The exterior surfaces of the sidewalk can optionally and preferably include a shoulder that can be engaged by a lower end portion of the lip at the joint formed between the sidewalls and the lip. A friction-stir weld can be formed at the joint to produce a hermetic seal extending about the perimeter of the base and cover along the length of the joint about the perimeter.

According to the present description, the joint formed between the cover and the base has a structure that produces effective and improved formation of a friction stir weld at the joint, especially a friction stir weld that does not contain a wormhole defect. Preferred metal components include opposed surfaces and edges that fit closely together to form the joint, for example to provide a fit of the lip with the shoulder at the joint to prevent (minimize) the presence of any openings present between surfaces of the two metal components at the joint which may contain air. To provide a precision fit between the adjacent surfaces of the two metal components at the joint, and to prevent the presence of spaces between surfaces of the joint, the surfaces of the two metal components that form the joint can be precision formed to have precisely opposed and matching (i.e., complementary) surfaces and edges. Advantageously, with the reduced presence of spaces that contain air between the edges and surfaces of the two metal components of the joint, a friction stir weld formed at the joint is less prone to forming wormholes.

Figure 1A:
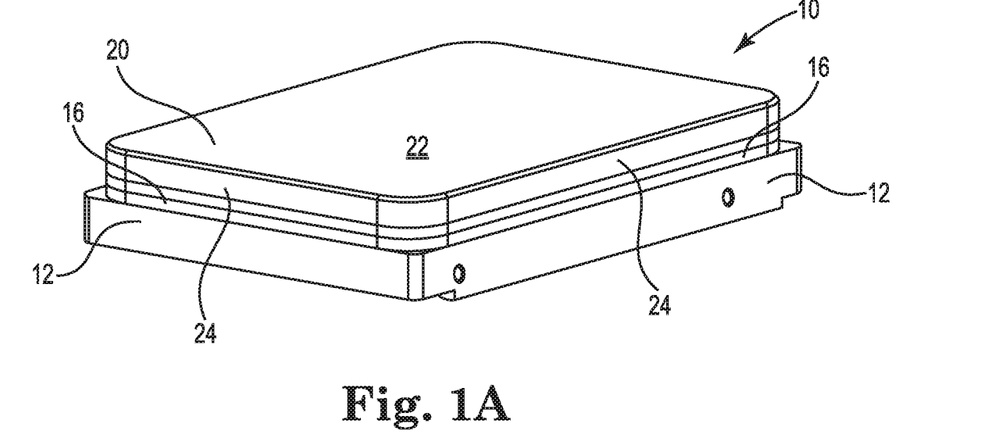
FIG. 1A shows a perspective view of an example assembly or device of the present description.
Figure 1B:
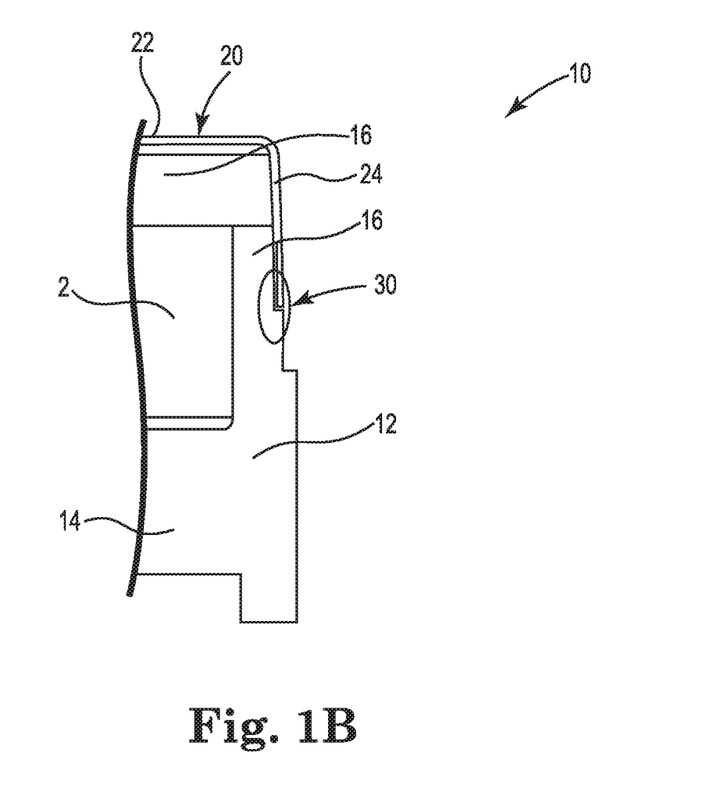
FIG. 1B shows a cross-sectional view of the assembly or device of FIG. 1A.
Figure 1C:
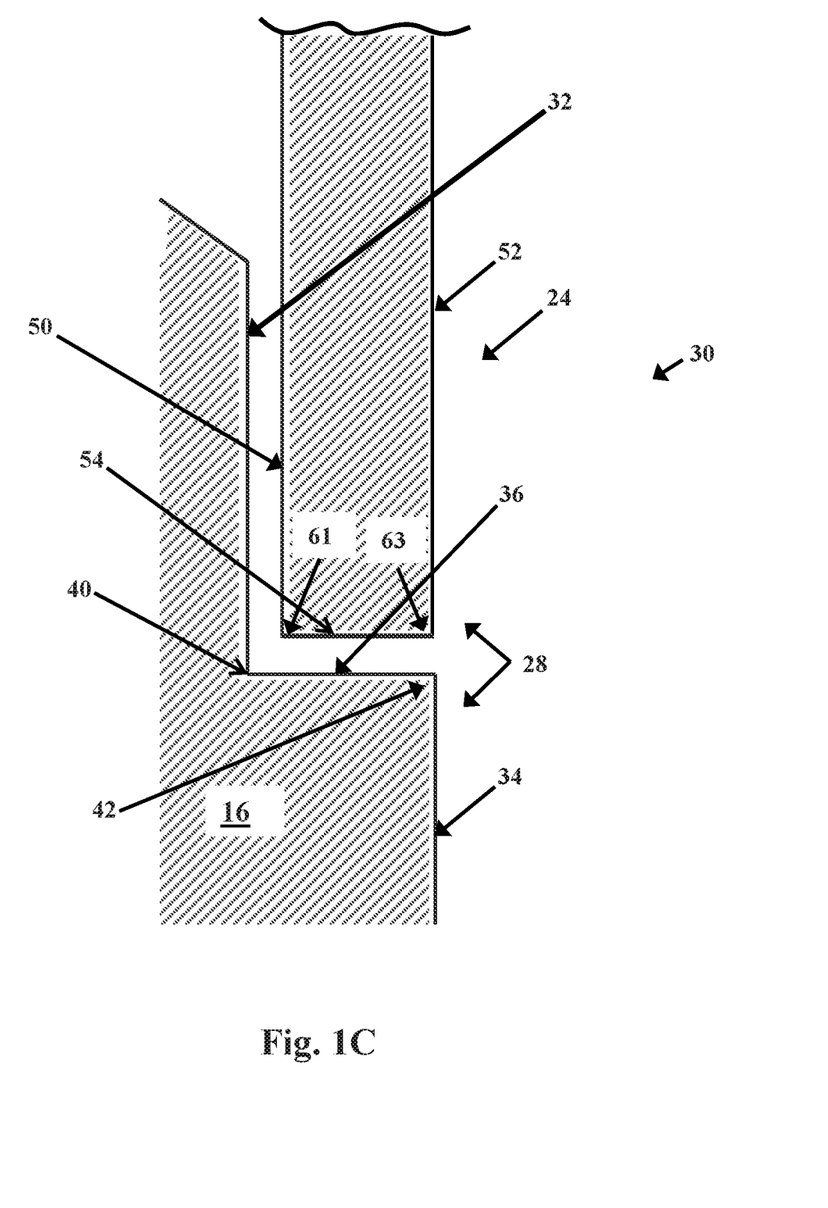
FIG. 1C shows an example of a joint of the present description, in cross section.

FIGS. 1A, 1B, and 1C show an example electronic device, e.g., hard disk drive, 10 that includes base 12, cover 20, and interior (cavity) 2. Base 12 includes a horizontally-extending bottom 14 having a perimeter from which sidewalls 16 extend in an upward vertical direction (i.e., at least substantially or approximately vertical with reference to horizontally-extending bottom 14). Cover 20 includes horizontally-extending top portion 22 having a perimeter from which extends lip 24 in a downward vertical direction (i.e., at least substantially or approximately vertical with reference to horizontally extending top portion 22).

As shown at FIG. 1C, a joint 30 is formed between a lower end of lip 24 and shoulder 28 located on an outer surface of sidewalls 16. In specific, an outer surface of sidewall 16 includes upper vertical shoulder surface 32, lower vertical shoulder surface 34, and horizontal shoulder surface 36 that extends between the upper vertical shoulder surface 32 and the lower vertical shoulder surface 34. Also part of shoulder 28 is interior shoulder corner 40 formed at the intersection of upper vertical shoulder surface 32 and horizontal shoulder surface 36, and exterior shoulder corner 42 formed at the intersection of horizontal shoulder surface 36 and lower vertical shoulder surface 34.

Also shown at FIG. 1C are surfaces and edges of a lower end of lip 24, including surfaces that engage shoulder 28 to form joint 30, and adjacent surfaces. These include vertical interior lip surface 50, vertical exterior lip surface 52, horizontal lip surface 54, interior lip corner 61, and exterior lip corner 63.

According to the present description generally, and as illustrated by example joint 30 of FIG. 1C, a joint as described is formed by assembling a cover that includes a lip, with a base that includes a shoulder, to form an enclosure. Joint 30 is formed by placing a lower end or portion of lip 24 in contact with, e.g., abutting, shoulder 28, and is referred to as a joint when the components are assembled and remain in an un-welded state, previous to a step of forming a weld at joint 30. The example joint 30 includes the lower end or portion of the lip (e.g., 24) in contact with (and covering) upper vertical shoulder surface 32 of shoulder 28. Lip 24 engages shoulder 28 with interior lip corner 61 being located adjacent to interior shoulder corner 40. Horizontal lip surface 54 contacts and is supported by horizontal shoulder surface 36.

According to preferred joints as described, surfaces of the lip and the shoulder have certain preferred and precision controlled dimensions, shapes, and relative sizes, to provide a tightly-fitting joint with a reduced or minimum allowance for spaces of air between the opposed surfaces of the joint. Referring again to FIG. 1C, one feature of the surfaces of joint 30 is squared corners of the lip and the shoulder, as opposed to rounded or curved corners. For example, corners 61 and 63 of the lower end of lip 24 can preferably have a radius of curvature that is less than 10 mils, for example less than 6 mils or less than 4 mils. A lip end with corners of these low radii of curvature will exhibit a substantially squared cross section that will fit tightly with complementary surfaces and corners of a shoulder that is also formed with a high level of precision. Note that FIG. 1C, being schematic and not to scale, shows apparent spaces between opposed surfaces and corners of joint 30. These spaces are reduced or substantially eliminated in practice, i.e., in practice, opposed surfaces 34 and 50 will contact each other, and opposed surfaces 36 and 54 will contact each other, eliminating spaces between these surfaces.

To produce a lip end that has a substantially squared cross section, with corners having a radius of curvature that is less than 10 mils, the end the lip should be formed by a step of cutting the end, and without a step of bending or folding material that is at or near the end of the lip in a manner that would provide a curved surface at the lip end after formation. By useful methods, a lip end can be prepared to exhibit a "square" edge form by use of an edge trimming machine or die such as a machine or die of a type sometimes referred to as a "shimmy trimming die," which are known to be useful for trimming edges of metal parts in a manner that results in a highly precise and clean-cut (e.g., squared) edge. Examples of this type of edge trimming machine are sold under the trade name Brehm® shimmy dies and edge trimming machines.

Figures 2A, 2B:
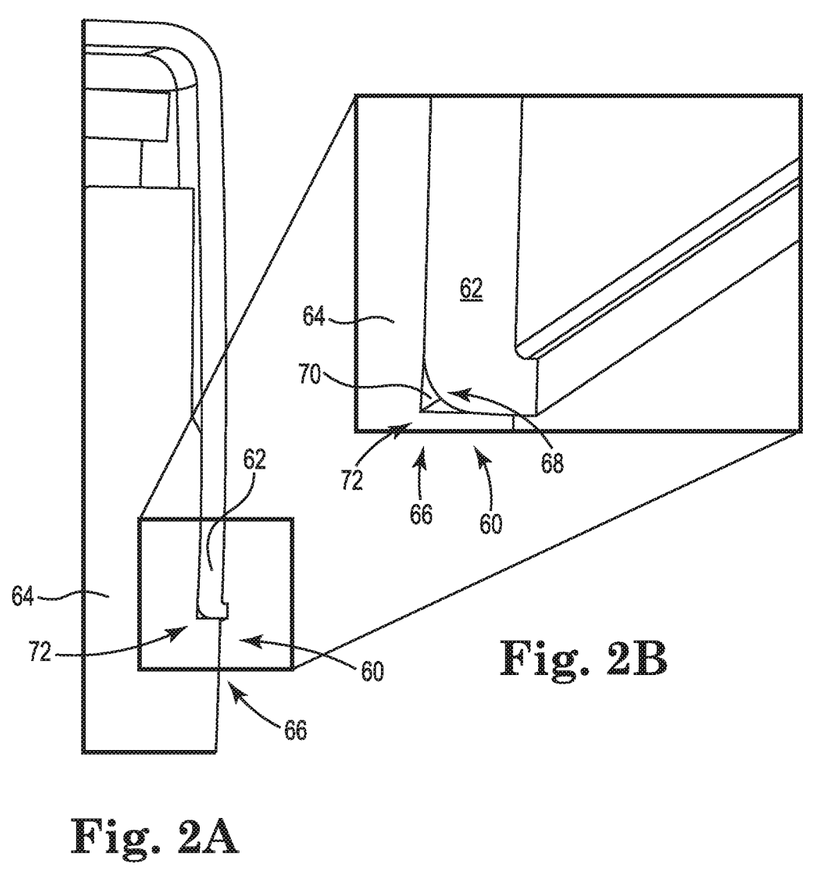
FIGS. 2A and 2B show cross-sectional views of a joint.

In contrast, other methods that are known and available for forming an end of a metal piece can form a bend or rounded corner of a lip end in a manner that is less desirable as compared to a squared corner, e.g., because the rounded corner of the lip end allows for a space between the lip end and a shoulder. One such less desired method is known as a "pinch trim cut," which creates an undesired rounded corner when cutting an end of a metal piece such as an end of a lip of a cover of the present description. Referring to FIGS. 2A and 2B, illustrated joint 60 includes a lip end that is undesirably rounded. Joint 60 is formed as a feature of an assembly of a base that includes sidewall 64 and a cover that includes lip 62. Sidewall 64 includes shoulder 66 with interior shoulder corner 72. As illustrated, the end of lip 62 abuts shoulder 66 at joint 60. The end of lip 62 includes interior corner 68, which is substantially rounded or curved, i.e., has a radius of curvature that is significantly greater than a radius of curvature of interior shoulder corner 72 of shoulder 66. As a result, with end of lip 62 being seated adjacent to shoulder 66, a significant length-wise space or opening 70 is present between the surfaces that form interior shoulder corner 72, which has a low radius of curvature, and the surface of interior corner 68, which has a substantially greater radius of curvature. When a friction stir weld is formed at joint 60, space 70 extending along a length of joint 60 has the potential of causing a wormhole defect in the weld.

According to example embodiments of assemblies of the invention, a joint that includes a precisely formed and squared lip end, and a complementary precisely squared shoulder of a sidewall, are preferred for minimizing space and air between surfaces of the joint. Other design options of opposed joint surfaces can also be effective to reduce the presence of space and air between surfaces of a joint. For example, rounded opposed surfaces of a joint, as opposed to squared opposed surfaces, can also be formed to produce a very close fit with a minimum of space and air in between, if radii of curvatures of opposed rounded surfaces of corners are very similar (in contrast to the corners of joint 60 of FIGS. 2A and 2B). But while a close fit between opposed rounded surfaces of a joint may be potentially effective to minimize an air gap, this may not be the most preferred approach for forming an enclosure of a hermetically sealed electronic device. Generally, it can be more difficult to accurately match the shapes (e.g., radius of curvature) of two opposed rounded corners to produce a precision fit between the two rounded corners or surfaces, as compared to squared corners. In addition, a lip end and a shoulder that have opposed rounded surfaces at corners of a joint, even if precisely formed, may be difficult to place in precise proximity because the rounded corners can allow the end of the lip to slip past the shoulder and past a desired installation height when assembling the two components to produce the joint.

A lip and an end of a lip can have any thicknesses that are useful to form an assembly and enclosure as described. Preferably, a lip end that has a highly-squared profile can have a thickness that matches a width of a horizontal surface of a shoulder, as the lip end and the shoulder are engaged to form a joint. Referring again to FIG. 1C, horizontal shoulder surface 36 has a width extending between interior shoulder corner 40 and exterior shoulder corner 42. Also, horizontal lip surface 54 has a thickness between interior lip corner 61 and exterior lip corner 63. In preferred assemblies and joints, lower lip end 54 has a thickness that is approximately equal to the width of horizontal shoulder surface 36 (due to the schematic nature of FIG. 1C, the thickness of end lip 54 is not illustrated to be identically the same as the width of surface 36, but in practice this can be preferred according to the present description). For example, the width of horizontal shoulder surface 36 can be up to but not more than 30 percent greater than or less than the thickness of horizontal lip surface 54; i.e. the thickness of lower end of the lip 24 between the interior lip corner and the exterior lip corner is not more than 30 percent greater than the width of horizontal shoulder surface 36, and is not more than 30 percent less than the width of horizontal shoulder surface 36. In other embodiments the width of the horizontal shoulder surface can be not more than 5, 10, or 20 percent greater than or less than the thickness of the horizontal lip surface. In example assemblies, a lower lip end can have a thickness that is less than about 25 mils, e.g., less than 20 or less than 16 mils.

The other component of the joint, i.e., the shoulder of the base sidewall, can be formed in a highly precise manner to produce surfaces and corners as described, including an interior corner having a radius of curvature that is less than 10 mils, for example less than 6 mils or less than 4 mils. Any method of forming the shoulder surfaces and corners to this level of precision can be useful, with specific examples of useful methods include milling and CNC (computer numerical control) machining. Generally, extrusion and casting methods may not be effective to produce an interior corner of a shoulder that exhibits a desirably low (as described herein) radius of curvature, without additional machining.

The thickness of the sidewall at the joint or shoulder can be any thickness that can be useful, and may preferably be a thickness that is greater than a thickness of the lip end at the joint. Example thicknesses of a sidewall at the joint or shoulder may be, for example, at least 2.5 millimeters (mm), measured from upper vertical shoulder surface 32 or lower vertical shoulder 34, to an interior surface of sidewall 16, e.g., at cavity 2 (see FIG. 1B).

A joint as described can be processed by a step of friction stir welding to produce a weld along the length of the joint, e.g., around the entire perimeter of the cover at the lip, preferably to produce a hermetic seal. Friction stir welding of the components of a joint as described can be performed by rotating a friction stir welding tool and contacting the rotating tool to the joint. The rotating tool generates heat at the joint to soften and cause flow of the metal material of the lip end and the base at the shoulder. Specifically, the rotating tool heats and mechanically mixes and joins the base and the lip, at the joint, using mechanical pressure to soften regions of the lip and the base in contact with and adjacent the tool, and blends a portion of material from the lip with a portion of material from the base. In preferred embodiments, depth of the friction stir weld is at least as deep as the thickness of the lip end, preferably at least 5 or 10 percent greater than the thickness of the lip end.

Figure 3:
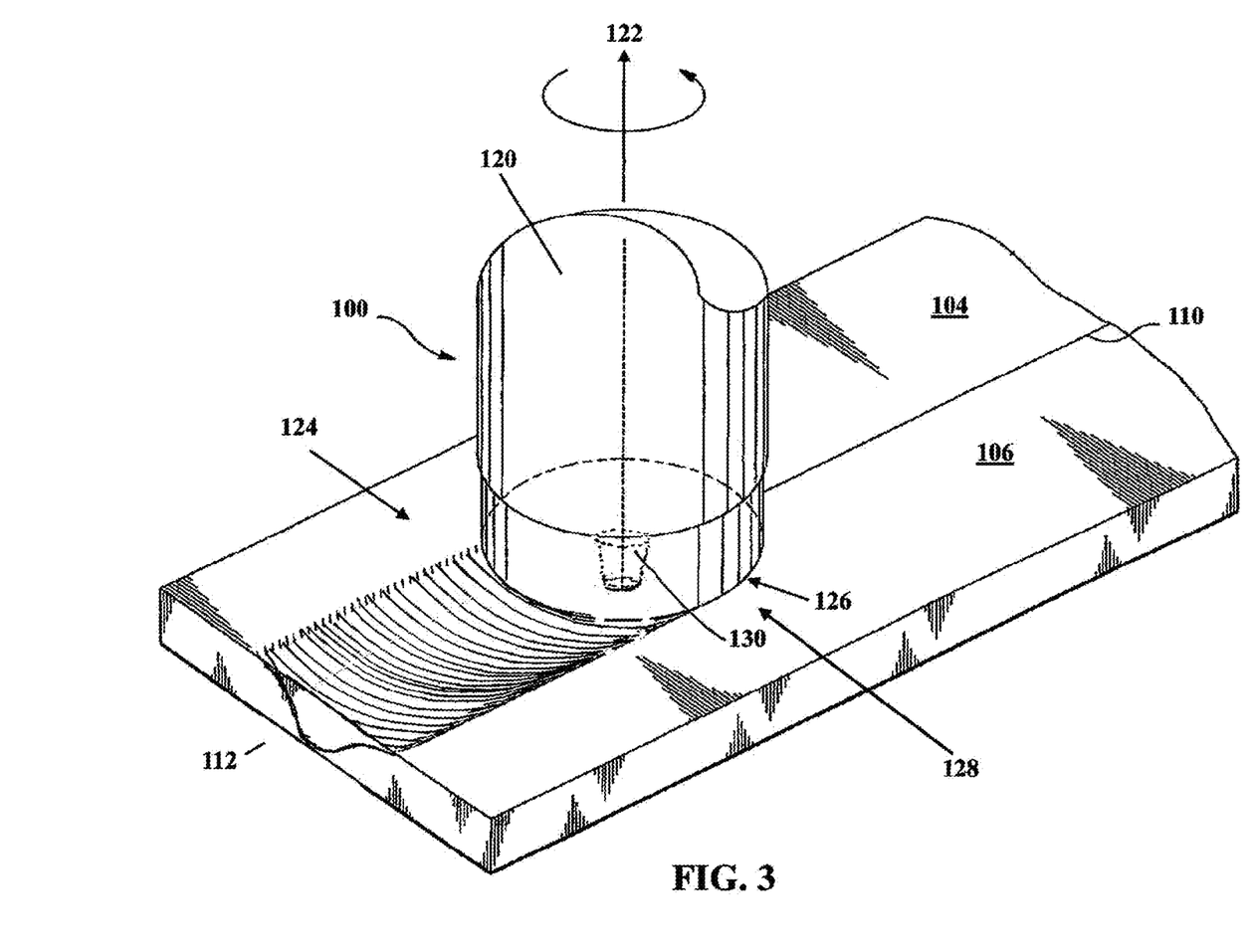
FIG. 3 shows an example of a step of forming a friction stir weld.

Referring to FIG. 3, a method of friction stir welding a joint as described can be performed by providing a tool 100 for forming a friction stir weld and rotating the tool, while applying pressure at joint 110, to form a friction stir weld 112. A first metal component 104 and a second metal component 106 meet at adjacent edges to form joint 110, e.g., as described herein. Tool 100 includes support body 120 having longitudinal axis 122 and distal end 124. Shoulder 126 at distal end 124 includes distal face 128 (held against a top surface of joint 110) adapted to contact surfaces of components 104 and 106 at joint 110 during friction stir welding. Distal face 128 is centered on axis 122 and extends laterally to a perimeter at shoulder 126 centered on the axis. Extending in a distal direction from distal face 128, along axis 122, is pin 130, which extends into first and second metal components 104 and 106 at joint 110 during friction stir welding. Useful or preferred tools 100 are described in Applicant's copending US patent application titled "FRICTION STIR WELDING TOOL, RELATE METHODS, AND ASSEMBLIES FORMED TO INCLUDE FRICTION STIR WELD, published as U.S. Publication No. 2019/0076957, the entirety of which is incorporated herein by reference.

During formation of a friction stir weld to produce a friction stir weld (112) along a length of a joint 110, distal face 128 of tool 100 is placed in contact with surfaces of components 104 and 106 at joint 110. Pressure from tool 100 is applied to the joint as tool 100 is rotated to soften or melt materials of metal components 104 and 106. As tool 100 moves along joint 110, friction stir weld 112 is formed.

Parameters of a useful step of forming a friction stir weld can be any that are useful to produce a desired friction stir weld, preferably one that does not include defects such as a wormhole. Examples of parameters that can be selected and controlled include rotation speed of the tool, downforce of the tool against the workpiece, speed of the tool along the length of the joint (i.e., speed of forming the weld in a length-wise direction, also referred to as translational speed), as well as dimensions of the tool itself such as the diameter of the tool at the shoulder (distal face) and the diameter the length of the pin (pin length being measured along the axis of the tool, from the distal face).

A diameter of the tool at the shoulder (i.e., a maximum diameter at the distal face) can approximate a width of a friction stir weld that is formed. Any useful diameter can be used that will provide a weld that has sufficient strength, and that will be useful for efficiently preparing a friction stir weld as described. Examples of diameters of a tool at the shoulder, and corresponding widths of a friction stir weld, may be less than about 10 millimeters, e.g., in a range from 2 to 10 millimeters, such as from 3 to 4 or 3 to 5 millimeters.

A depth of a friction stir weld will typically be slightly greater than a length of a pin extending from the distal face of a tool used to form the weld. A desired depth of a weld as described herein is at least as deep as, preferably deeper than, the thickness of the lip end and the width of the shoulder at a joint at which the weld is formed. To form a weld of this depth, the length of the pin should be at least as long as the thickness of the lip (at the joint) and at least as long as the width of the shoulder, preferably at least 5, 10, 20, or 30 percent greater than each of those dimensions. According to certain embodiments of tools and friction stir weld methods, a length of a pin can be in a range from 0.2 to 1.5 millimeters. A diameter of the pin, measured at a base of the pin located at a connection of the pin to the distal face, can be any useful diameter, such as a diameter in a range from 0.5 to 1.5 millimeters, measured at a base of the pin located at a connection of the pin with the distal face.

During formation of the weld, the tool can be rotated at a speed that is useful to add sufficient energy to the two metal components of a joint, to soften the metal components and allow mixing of the metal components by the tool. Useful and preferred rotational speeds of a tool to form a friction stir weld as described can be at least 1,000 revolutions per minute (rpm), e.g., at least 2,000 rpm, or at least 6,000, 8,000, or 12,000 rpm, and up to about 30,000 rpm.

During formation of the weld the tool, i.e., at the distal face, can apply a downforce to the two metal components at the joint, in a direction along the axis of the tool. Any amount of downforce can be used that will be effective in forming a desired weld in an efficient manner. Examples of a useful downforce may less than about 1,000 newtons, e.g., less than 500 newtons.

During formation of the weld a tool may be moved along a joint, in a lengthwise direction, at any useful speed, preferably a speed that will efficiently form a defect-free weld. Examples of useful speeds of a tool along a joint during formation of a friction stir weld can be in a range from about 0.1 to 3 meters per minute (1.6 to 50 millimeters per second).

The invention claimed is:

1. An electronic apparatus comprising:
    a base that includes a horizontal bottom and an inner cavity defined by the bottom and vertical base sidewalls at a base periphery, the sidewalls including an outer surface that includes a shoulder including an upper vertical shoulder surface connecting to a horizontal shoulder surface at an interior shoulder corner, the horizontal shoulder surface extending horizontally from the interior shoulder corner to an exterior shoulder corner, and a lower vertical shoulder surface extending vertically from the exterior shoulder corner, the horizontal shoulder surface having a width from the interior shoulder corner to the exterior shoulder corner;
    a cover located over the base to enclose the cavity, the cover including a horizontal top portion over the cavity and a lip at a cover perimeter, the lip extending in a vertical direction relative to the horizontal top portion, the lip including a lower lip end that includes:
        a vertical interior lip surface,
        a vertical exterior lip surface,
        a horizontal lip surface extending between the vertical interior lip surface and the vertical exterior lip surface,
        an interior lip corner at an intersection of the horizontal lip surface and the vertical interior lip surface, and
        an exterior lip corner at an intersection of the horizontal lip surface and the vertical exterior lip surface;
    wherein:
        the lip engages the upper vertical shoulder surface and engages the shoulder with the interior lip corner being located adjacent to the interior shoulder corner,
        the lower lip end has a thickness between the interior lip corner and the exterior lip corner that is approximately equal to the width of the horizontal shoulder surface, and
        a radius of curvature of the interior lip corner is in a range from 4 mils to 10 mils.

2. The apparatus of claim 1 wherein the thickness between the interior lip corner and the exterior lip corner is not more than 30 percent greater than the width of the horizontal shoulder surface, and is not more than 30 percent less than the width of the horizontal shoulder surface.

3. The apparatus of claim 1 wherein the lower lip has a thickness of less than 25 mils.

4. The apparatus of claim 1 wherein the horizontal lip surface is formed by cutting a metal piece without bending the metal piece near the horizontal lip surface.

5. The apparatus of claim 1 wherein the upper vertical shoulder surface, horizontal shoulder surface, and interior shoulder corner are formed by a method that includes milling, computer numerical control machining, or both.

6. The apparatus of claim 1 wherein a radius of curvature of the interior shoulder corner is less than 10 mils.

7. The apparatus of claim 1 wherein a thickness of the sidewall at the shoulder is at least 2.5 millimeters.

8. The apparatus of claim 1 wherein the apparatus is a hermetically sealed electronic device.

9. The apparatus of claim 8 comprising an interior that includes a helium atmosphere.

10. The apparatus of claim 8 wherein the apparatus is a hard disk drive.

11. The apparatus of claim 1 wherein a radius of curvature of the interior shoulder corner is less than 6 mils.

12. The apparatus of claim 1 wherein a radius of curvature of the interior shoulder corner is less than 4 mils.

13. A method of forming a friction stir weld, the method comprising:
    providing the apparatus of claim 1,
    providing a tool for forming a friction stir weld, the tool comprising:
        a support body having a longitudinal axis and a distal end,
        a distal face at the distal end, and
        a pin extending from the distal face along the axis,
    placing the distal face in contact with the apparatus at a joint formed between the lower lip end and the shoulder, and rotating the tool about the axis while the distal face contacts the joint.

14. A method of claim 13 wherein a depth of the friction stir weld is at least 10 percent greater than the thickness of the lower lip end.

15. A method of claim 13 wherein a width of the friction stir weld is less than 10 millimeters.

16. A method of claim 13 wherein the shoulder has a diameter in a range from 2 to 10 millimeters measured at a location of the support body adjacent to the distal face.

17. A method of claim 13 wherein the pin has a length along the axis from the distal face to a distal end of the pin that is equal to or greater than the lower lip thickness.

* * * * *